Dec. 1, 1959   M. P. MAGNUSON ET AL   2,914,796
FOOD PACKING DEVICE
Filed July 22, 1957   2 Sheets-Sheet 2
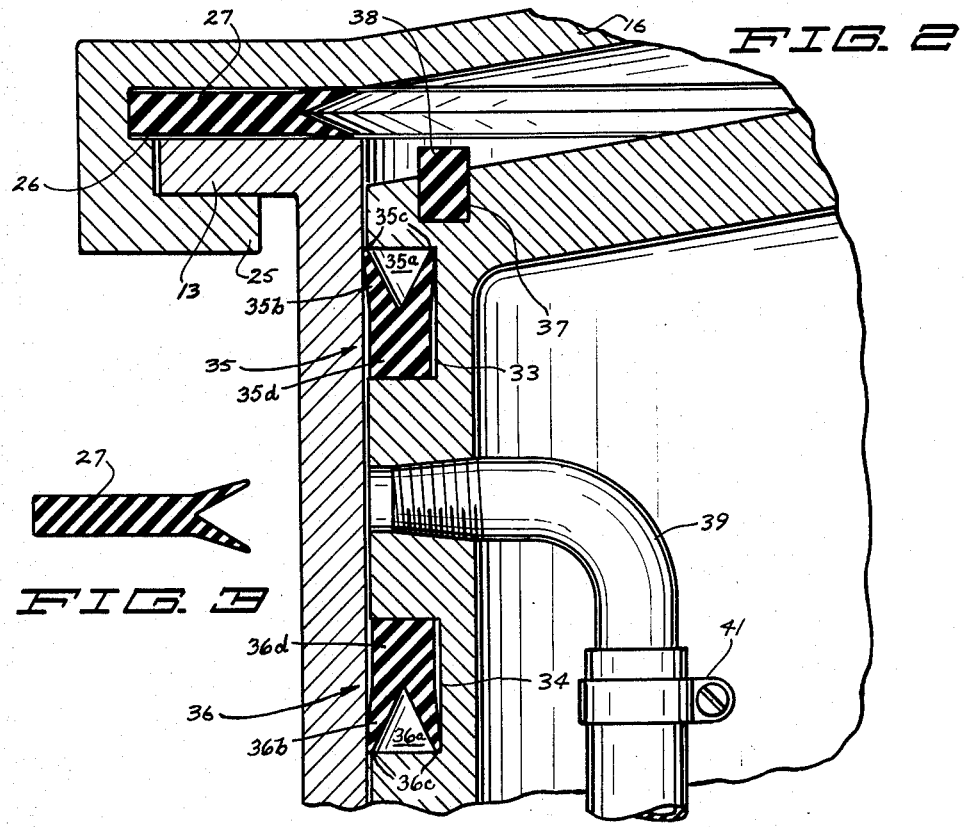
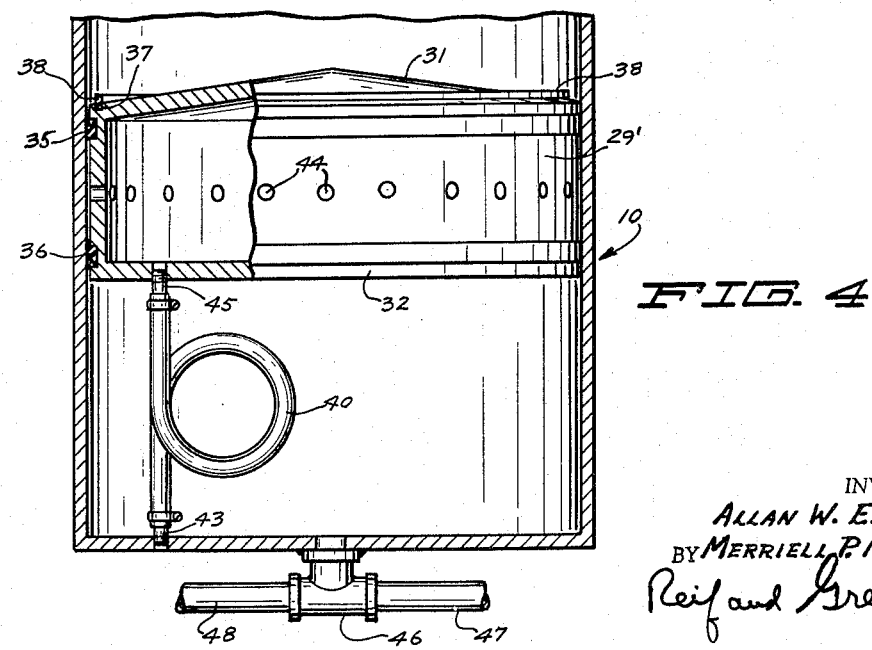
INVENTOR.
ALLAN W. ELLETSON
BY MERRIELL P. MAGNUSON
Reif and Gregory
ATTORNEYS

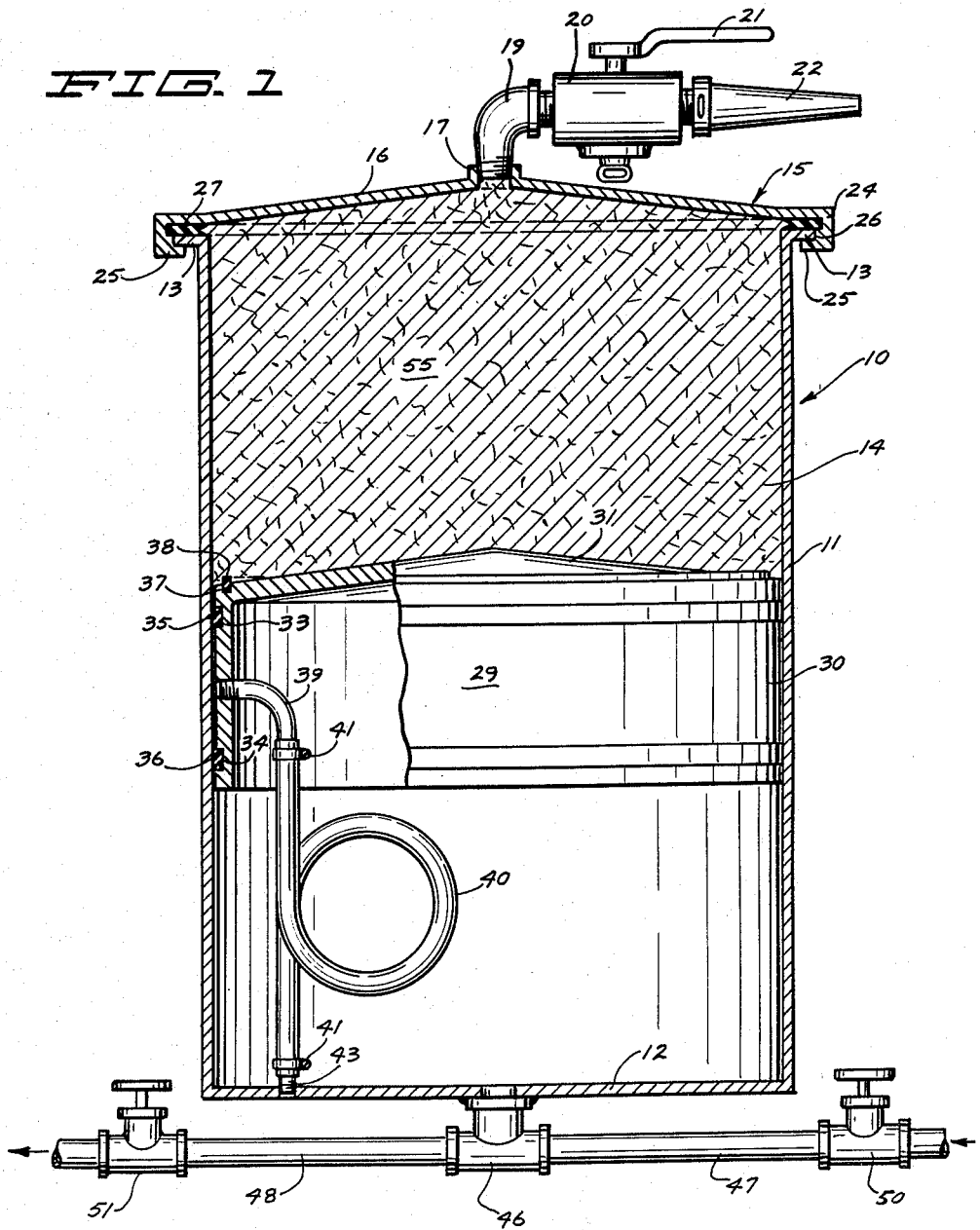

United States Patent Office 2,914,796
Patented Dec. 1, 1959

2,914,796

FOOD PACKING DEVICE

Merriell P. Magnuson, Minneapolis, and
Allan W. Elletson, Dassel, Minn.

Application July 22, 1957, Serial No. 673,202

2 Claims. (Cl. 17—39)

This invention relates to an improvement in a food packing device of a type used for making sausage and the like by forcing material under pressure through an outlet to fill skins for receiving said material.

This invention has to do with such a food packing device comprising generally a cylindrical casing having a free floating piston therein movable by fluid pressure to force material under pressure through an outlet in said casing into suitable skins.

It is desirable to have some means for preventing the passage of fluid between said piston and the casing wall whereby said fluid tends to dilute the food material.

It is also desirable to have some means for preventing the passage of food material between said piston and said casing.

It is also desirable to have a means for sealing the cover of said food packing device in such a manner that the sealing member becomes more effective as the pressure of material against it increases.

It is also desirable in the event of the passage of some fluid or material between the piston and the casing to have means for discharging and disposing of said fluid and said material to prevent an accumulation of the same between the piston and the wall of the casing.

It has been found that sealing members in general which are used for sealing the piston in operating position or for sealing the cover when subjected to substantial amounts of pressure tend to contract at their leading edges to permit the passage of fluid or material whereby a passage is formed between the sealing member and the wall of the casing.

It is an object therefore of this invention to provide sealing members to be used in connection with a piston in the casing of a food packing device whereby said sealing members will expand and intensify their sealing effect at their leading edges when subjected to the pressure of fluid or food material.

It is also an object of this invention to provide such a sealing member for the cover of such a food packing device.

It is also an object of this invention in connection with the casing of a food packing device and a free floating piston therein to provide flexible sealing members vertically spaced and circumferentially disposed about said piston having their remote face portions adapted to expand in response to the pressure of fluid or material thereby minimizing the tendency of said fluid or material to bypass said sealing members.

It is a further object of this invention in connection with the structure set forth in the previous object to have V-shaped grooves formed in said remote face portions of said sealing members whereby the free ends thus formed will tend to separate and intensify their sealing effect in response to the pressure of fluid or material therebetween.

It is also an object of this invention to provide flexible means intermediate said sealing members movable with said piston communicating with the atmosphere and with the area between said piston and the wall of said casing for the discharge of fluid or material which may enter said area.

It is another object of this invention to provide a free floating piston having enclosed ends and a chamber formed therein having vertically spaced sealing members circumferentially disposed thereabout, said piston having a plurality of apertures circumferentially spaced thereabout providing communication between the chamber in said piston and the area between said piston and said casing, and a flexible conduit communicating with said chamber at one end and with the atmosphere at its other end for the discharge of fluid or material in said chamber.

These and other objects and advantages of the invention will be fully set forth in the following description made in connection with the accompanying drawings in which like reference characters refer to similar parts throughout the several views and in which:

Fig. 1 is a view of applicants' device with some parts shown in elevation, with the most part shown in central vertical section and a portion thereof shown in broken section;

Fig. 2 is a portion of Fig. 1 on an enlarged scale showing a detail thereof;

Fig. 3 is a view of a broken away portion of applicants' sealing member on an enlarged scale in vertical section;

Fig. 4 is a broken view in central vertical section with some parts in elevation of a modification of a portion of applicants' device; and Fig. 5 is a broken view in elevation on a somewhat enlarged scale of a portion of applicants' cover fastening structure.

Referring to the drawings, and particularly to Fig. 1, applicants' device is shown comprising a casing 10. Said casing may be variously formed and is here shown as being cylindrical having a body portion 11 and a flat enclosed lower end 12. An annular flange or lip 13 is formed about the upper end of said casing 10 comprising a plurality of spaced lugs or keys 13a. Within said casing 10 is a chamber 14.

Adapted to be removably secured to the upper end portion of said casing 10 is a cover 15 which in the present embodiment is illustrated as having an outwardly extending internally threaded boss 17 at the center thereof. Threaded into said boss is an L fitting 19 and secured to said fitting is a valve 20 which carries a casing spout 22. Said valve is provided with a handle 21 for operating the same.

Said cover 15 has a substantially U-shaped annular flange portion 24 with its lower inwardly extending flange 25 comprising a plurality of spaced lugs or keys adapted to register and interlock with said lugs or keys 13a in said flange 13 by a partial rotation. Said flange 24 has an offset portion 26 forming a groove of small depth with the upper portion of said flange 24. Disposed in said groove is a sealing member 27. As shown in Fig. 3 said sealing member in the embodiment here illustrated is preferably formed of a somewhat resilient material having a body portion of substantially uniform thickness and having a V-shaped grooved end portion providing two free end portions separated to a width substantially greater than the width of said body portion whereby said free end portions are placed under substantial pressure when in operating position to form a very effective seal. Disposed in said chamber 14 is a piston 29. Said piston may be variously formed but is here shown to be of a free floating variety formed as an inverted cup-shaped shell having a cylindrical body portion 30 and having an inclined top portion 31 adapted to mate with the inner side of said top portion 16 of cover 15.

Formed circumferentially about said piston 29 in parallel relation are a pair of grooves 33 and 34 respectively positioned adjacent the top and bottom of said piston. Respectively disposed about said piston 29 in said grooves 33 and 34 are annular sealing members 35 and 36. Said sealing members will be adapted to fit very snugly in said grooves.

In the embodiment of applicants' invention here illustrated, said sealing members will be formed of a somewhat resilient material having body portions of substantially uniform thickness and rectangular in cross section. Said sealing members will have V-shaped grooves 35a and 36a respectively formed along the ends 35b and 36b thereof with said V-shaped grooves providing pairs of free end portions 35c and 36c. Said free end portions 35c and 36c are flared outwardly and are formed to have a width substantially greater than the width of the body portions 35d and 36d of said sealing members whereby when in operating position said free end portions 35c and 36c respectively will be placed under substantial compression and a greater compression than said body portions of said sealing members. Said sealing members will be positioned so that the V-grooved portions thereof respectively will be in the ends of said sealing members remote from one another.

Said top portion 31 of said piston 29 is provided with an annular groove 37 and disposed therein is an annular resilient member 38 adapted to be removably secured in said groove 37 and to extend upwardly for a short distance above the outer surface of said top 31.

An L fitting 39 will be secured to said body portion 30 and will communicate with the passage formed between said piston 29 and the inner surface of casing 10 in the area between said sealing members 35 and 36. Connected to said fitting 39 is a flexible conduit 40 secured to fitting 39 by a clamp 41 at one end and secured to a fitting 43 by a clamp 41 at its other end. Said fitting 43 will be secured to the bottom 12 of casing 10 and adapted to communicate with the atmosphere. Said conduit 40 will be of a length to permit said piston 29 to be moved upwardly the full height of casing 10 and also to be removed therefrom a short distance. Said conduit 40 will be adapted to form into a coiled position as said piston is lowered in said casing 10.

Secured to said bottom 12 is a T fitting 46 communicating with said chamber 14. Threaded into said fitting 46 is an inlet conduit 47 and an outlet conduit 48 respectively provided with valves 50 and 51. Said conduit 47 will be connected to a source of fluid under pressure and said conduit 48 will discharge to the atmosphere.

In operation, the valve 50 will be in closed position and piston 29 will be at its lowermost position in said casing 10. Said top 15 will be removed and said casing will be filled with food material 55. Said top will be replaced and secured. Casings to be filled with the food material to form sausage and the like will be secured to said spout 22. Said casings are not here illustrated.

The valve 20 will be opened. Said valve 50 will be opened. In the embodiment of the applicants' invention here illustrated, it is indicated as being operated by water under pressure and it is successfully operated by water under pressure varying from forty to one hundred pounds. It operates successfully under a low water pressure. Conduit 47 will therefore be connected to a source of water. As valve 50 is opened, valve 51 will be closed and water will enter the chamber 14 beneath the piston 29. Thus said piston will be raised upwardly forcing said food material 55 through spout 22.

To acquire a satisfactory free floating action there will be some space between the walls of said piston 29 and body portion 11. Said sealing members 35 and 36 will be under compression in operating position to form effective seals. As water enters said chamber 14 beneath said piston 29 there will be a tendency for it to bypass the sealing member 36. Water will move into the area formed by the V-shaped groove and it will cause a spread of the free end portions of said sealing member 36, thus causing said free end portions to form a tighter seal increasing in effectiveness in relation to the pressure of the water bearing against them. Thus said sealing member 36 forms an unusually effective seal. It is extremely important that water be prevented from entering into the portion of said chamber 14 which contains the food material 55. The addition of any water to said food material will dilute the same and deteriorate its quality. There is however the possibility that some moisture may bypass said sealing member 36 and move into the area between said sealing member 36 and said sealing member 35.

Said sealing member 35 will operate in the same manner as said sealing member 36 to prevent the bypass of said food material 55.

Any moisture which may bypass said sealing member 36 will be discharged through conduit 40 to the atmosphere so that there will be no body of moisture building up any pressure in the passage between said sealing members 35 and 36. Hence there will be no tendency for moisture to attempt to bypass said seal 35 as there will be substantially less pressure encountered in discharging through said conduit 40.

When said piston 29 has been moved to its uppermost position the top 31 of said piston will tend to mate with said top 16 of cover 15 and said bumper 38 will be compressed against said top 16. The valve 50 will then be closed and the valve 51 opened whereby the water in chamber 14 below piston 29 will discharge. The pressure of the compression of the bumper 38 will break said piston 29 free from its contact with said top portion 16. The seal 27 which is formed in the same manner as said seals 35 and 36 intensifies its sealing effect with the increasing pressure of food material bearing against its V-shaped groove facing inwardly. Thus the free end portions of said seal are moved outwardly to increase their sealing effect and thus member 27 forms a very effective seal.

The process of removing cover 15 and refilling chamber 14 with food material 55 will then be repeated.

With reference to Fig. 4, a piston 29' is illustrated which is a modification of said piston 29 and is identical in all of its parts, bearing the same characters as similar parts of piston 29. Said piston 29' has an enclosed bottom portion 32. Circumferentially spaced about said piston centrally thereof are a plurality of apertures 44 adapted to provide communication between the chamber in said piston 29' and the area between said piston and the wall of casing 10 between said sealing members 35 and 36. Secured to said bottom 32 is a fitting 45 communicating with the chamber in said piston 29'. Said conduit 40 will be connected with said fitting 45 and said fitting 43 at the bottom of said casing for discharge to the atmosphere.

Applicants' device as modified above operates in the same manner as the above described operation.

Thus it is seen that we have provided a food packing device embodying the use of novelly constructed and very efficient sealing members disposed about the piston therein and for sealing the cover thereon. Applicants' device is manufactured on a commercial basis and has been found to be very successful in practice.

It will of course be understood that various changes may be made in the form, details, arrangement and proportions of the parts, without departing from the scope of applicants' invention, which, generally stated, consists in a device capable of carrying out the objects above set forth, in the parts and combinations of parts disclosed and defined in the appended claims.

What is claimed is:

1. A food packing device having in combination, a casing having enclosed ends, a free floating piston in said casing, a pair of parallel spaced sealing rings circumferentially about said piston and having V-shaped grooves in their remote ends, said sealing rings being positioned to have said V-shaped grooves facing in directions away from one another vertically of said casing, said remote ends each having a width greater than that of the body portions of their respective sealing members, one of the outer sides of each of said V-shaped grooves bearing against the adjacent surface of said casing to prevent the passage of matter thereby whereby said matter tends to be received into and accumulate in said V-shaped grooves respectively to fill the same and bear against the side of said sealing member adjacent the surface of the casing to increase the sealing effect thereof.

2. A food packing device adapted to be operated by fluid under pressure for packing sausage skins and the like with material under pressure having in combination, a substantially cylindrical casing having enclosed ends, a free floating piston in said casing, said piston being substantially cup-shaped in form having walls and a top portion of substantial thickness, a pair of spaced parallel resilient sealing rings substantially rectangular in cross section disposed about said piston, said piston having circumferential grooves substantially rectangular in cross section for receiving said sealing rings therein, said sealing rings respectively having end portions having V-shaped grooves therein, said sealing rings being positioned to have the open ends of said grooves respectively facing in directions away from one another vertically of said casing, said sealing rings having an increased width at said grooved end portions and having the outer sides of said grooved end portions flaring outwardly, a pair of free end portions thus being formed at each of said grooved end portions and one of said free ends of each of said sealing rings bearing against the adjacent surface of said casing, the pressure of said free ends against said surface deforming said grooved end portion to form a pressure engagement therewith creating a sealing effect between said free ends and the adjacent casing surface, said free ends tending to prevent the passage of any substance thereby such as water or food as the case may be, said substance tending to accumulate within said grooves to fill the same and bear against said free ends adjacent said casing surface to increase the sealing effect thereof.

References Cited in the file of this patent

UNITED STATES PATENTS

| | | |
|---|---|---|
| 894,039 | Napier | July 21, 1908 |
| 1,628,726 | Knowlton | May 17, 1927 |
| 2,238,182 | Napier | Apr. 15, 1941 |
| 2,248,835 | Hooydonk | July 8, 1941 |

FOREIGN PATENTS

| | | |
|---|---|---|
| 1,123,465 | France | June 11, 1956 |